UNITED STATES PATENT OFFICE.

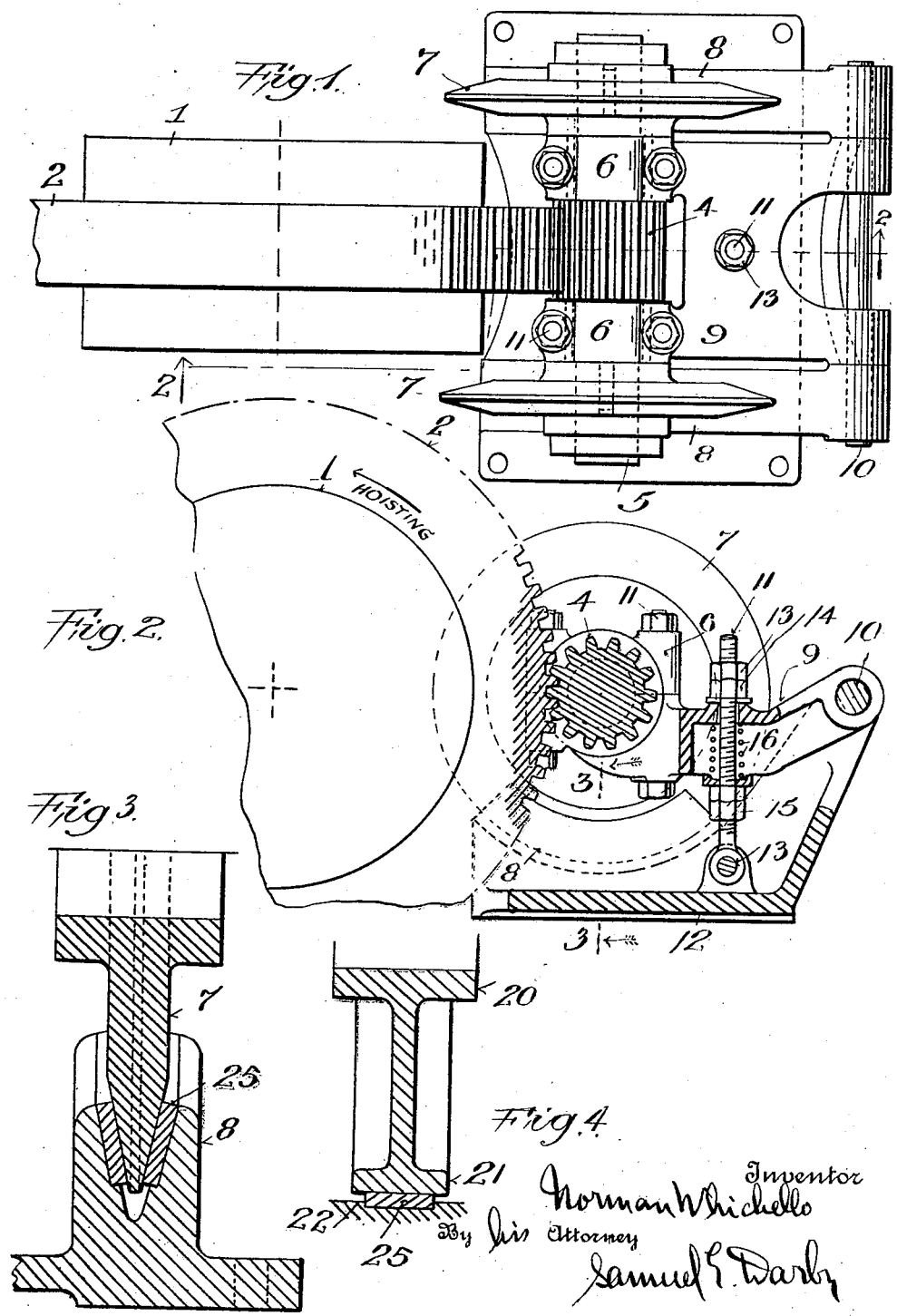

NORMAN WHICHELLO, OF MUSKEGON, MICHIGAN, ASSIGNOR TO MANNING, MAXWELL & MOORE INC., OF NEW YORK, N. Y., A CORPORATION OF NEW JERSEY.

FRICTION DEVICE.

1,285,859.  Specification of Letters Patent.  Patented Nov. 26, 1918.

Application filed December 11, 1916. Serial No. 136,238.

*To all whom it may concern:*

Be it known that I, NORMAN WHICHELLO, a citizen of the United States, residing at Muskegon, county of Muskegon, State of Michigan, have made a certain new and useful Invention in Friction Devices, of which the following is a specification.

This invention relates to friction devices and particularly to devices of this nature which are designed to permit a member to rotate in one direction and to prevent the member from rotating in the opposite direction.

The object of the invention is to provide a friction device of the character described which is simple in structure, efficient in operation and economical of manufacture.

A further object of the invention is to provide a friction device of the character referred to wherein side pressure on a floating member is utilized to prevent the rotation of the member in one direction.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawing:

Figure 1 is a top plan view of a device embodying my invention.

Fig. 2 is a sectional view of the same taken on the line 2—2, Fig. 1 and looking in the direction of the arrows.

Fig. 3 is a similar view taken on the line 3—3, Fig. 2 and looking in the direction of the arrows.

Fig. 4 is a detail sectional view of a modified structure embodying my invention.

The same part is designated by the same reference numeral wherever it occurs throughout the several views.

I will describe my invention as applied to a mechanical load brake for hoisting machinery, but I wish it to be understood that my invention, as defined in the claims, is not limited to this specific application, as my broad invention has for its object to permit a member to rotate in one direction and to prevent it from rotating in the opposite direction.

In devices of this nature there is usually one member which I will term the "floating" member, which must be free to rotate in one direction but restrained from rotating in the opposite direction. Usually, in mechanical load brakes, the floating member runs freely in hoisting and remains stationary in lowering, although, the reverse of this operation is also employed in some mechanical load brakes.

It is old in the art broadly to provide the floating member with a ring of spur gear teeth to which an auxiliary floating member is geared and to allow the auxiliary floating member to run in one direction, but not the other, thereby controlling likewise, the main floating member. In all devices of this nature, however, the end thrust on the auxiliary floating member has been utilized to prevent the rotation of the auxiliary floating member in one direction. In accordance with my invention I employ an auxiliary floating member geared to the main floating member, but I employ the side pressure upon the auxiliary floating member for preventing rotation in one direction which has certain important and practical advantages in practice over the types of devices of this nature which employ the end thrust feature.

Throughout this specification and appended claims I employ the term "end thrust" to signify a force applied in a direction parallel to the axis of rotation of the auxiliary floating member and the terms "side pressure" and "side motion", "lateral pressure" and "lateral motion", to signify a force or a motion applied in a direction tangential to the main floating member.

In the drawing, reference numeral 1, designates generally the main floating member or body of a mechanical load brake, said member having or carrying a spur gear 2, and 4 is a spur pinion meshing therewith. The spur pinion is either keyed to or formed integral with its shaft 5. The shaft 5, which is journaled in suitable bearings such as shown at 6, 6, carries two friction disks 7, 7, secured to it in any suitable manner, for example, keyed to the shaft.

The shaft 5, spur pinion 4, and the friction disks 7, 7, form the auxiliary floating member, and should be capable of moving laterally, that is, in a direction tangential to the main floating member, a short distance toward and away from the friction seats 8, 8, of the friction members 7, 7. In order to allow for this movement I form the bearings or journals 6, 6, in a casting 9 which is pivoted on a fixed axle or shaft 10. I provide an eye bolt 11 pivotally secured to the stationary base 12 as at 13. This eye bolt carries at its upper end two nuts 13, 14. On its lower end, I provide two nuts 15, and a coiled spring 16 is interposed between the nuts 15 and the casting 9. By means of the adjustable nuts 15 and the spring 16, I am enabled to counterbalance as much as may be desirable or necessary of the weight of the casting 9, and of the auxiliary floating member as a whole. By means of the adjusting nuts 13, 14 I can limit to any desired point, the upward movement of the casting 9, and consequently of the auxiliary floating member. It is obvious the limit of downward movement of the auxiliary floating member would be formed by the friction seats 8.

While I have found that it is desirable to locate the pivot shaft 10 of the casting 9 to the right of the auxiliary floating member, and also preferably in the same plane with a line drawn through the centers of the main and auxiliary floating members, it is to be understood that my invention, as defined in the claims, is not to be limited to these details. Likewise, the particular location of the spur pinion relative to the main floating member does not form the essence of the invention as it is obvious that the only requirement in this respect is that the spur gear 2 must mesh with the pinion 4, and so it is obvious that the auxiliary floating member may be placed at any point around the circumference of the gear 2, and that any type, style or form of gears may be employed without departing from the scope of my invention as defined in the claims.

The operation of the device is obvious. Referring to Fig. 2, I will assume that the main floating member is running in the direction for "hoisting," that is in this instance, counter-clock wise. It will be seen that due to the action of gear 2 with pinion 4, the auxiliary floating member will receive a small upward pressure, which together with the spring 16 raises the auxiliary floating member, and consequently raises the friction disks 7, 7, out of their seats 8, 8, or until there is very light contact between 7 and 8, it being understood that the nuts 13, 14 are adjusted to allow just sufficient upward movement of the casting 9 for the disks 7, 7 to escape or nearly escape contact with their seats, thus allowing the free or nearly free rotation of both main and auxiliary floating members as long as the main floating member is running in its "hoisting" direction. Now if the main floating member starts to rotate in the "lowering" direction, that is in the form shown in Fig. 2, clockwise, the side pressure on the auxiliary floating members is reversed, and in consequence the disks 7, 7, are pressed into contact with their friction seats 8, 8 which thereby prevent rotation of the auxiliary floating member and consequently of the main floating member.

In Fig. 3 I have shown a detail view of the friction disks 7 and their seats 8. In the form shown, which I find efficient and desirable, the outer edge of the disks 7 is tapered on both sides, and is thrust between the two sides of the seat 8 like a wedge, which greatly increases the friction between the two members. While this is an efficient form, as above stated, my invention is not to be limited to any particular type or form of friction device, as many types and forms will readily occur to those skilled in the art. For example, I show a modified form of friction device in Fig. 4, wherein the disk 7 is replaced by a wheel 20 having a cylindrical periphery 21, which would press down upon the friction seat 22 in consequence of side pressure on the pinion as above described. Although it is not necessary, and does not form the subject matter of my present invention, the friction seats 8 and 21 may be provided, if desired, with a suitable friction lining material as shown at 25.

Having now set forth the objects and nature of my invention, and having shown and described a specific structure embodying the principles thereof, what I claim as new and useful, and of my own invention, and desire to secure by Letters Patent is,—

1. The combination with a rotatable main floating member, an auxiliary floating member, said members being geared to each other, and a movably mounted yieldingly resisted support for the auxiliary floating member, of means operated by the yielding movement of the auxiliary member in one direction to lock the main floating member against rotation.

2. The combination with a main and an auxiliary floating member, said members being geared to each other, said auxiliary member being mounted for movement tangentially to the main floating member under the influence of the side pressure exerted thereon by the main floating member, and means to yieldingly resist said tangential movement, of means operated by the tangential movement of the auxiliary member in one direction to lock the main floating member against rotation.

3. The combination of a main floating member including a gear, a pinion meshing with said gear, a friction member carried by said pinion, a support for said pinion to permit lateral movement thereof, means to yieldingly resist said lateral movement, and a friction seat with which said friction member engages when moved laterally in one direction to lock the main floating member against rotation.

4. The combination of a main floating member including a gear, a pinion meshing with and driven by said gear, a friction member carried by said pinion, a coöperating friction seat for said friction member, a support for said pinion and friction member and means to yieldingly resist the movement of the friction member toward said seat.

5. The combination of a main floating member including a gear, a pinion meshing with and driven by said gear, a friction member carried by said pinion, a coöperating friction seat for said friction member, and a pivotally mounted yieldingly resisted support for said pinion and friction member to permit movement of said friction member toward and from its coöperating seat to lock said main floating member against or release the same for rotation.

6. The combination with a rotatable main floating member, of an auxiliary floating member, said members respectively including intermeshing gears, of frictionally engaging devices arranged to become effective to lock said main floating member against reverse rotation, said auxiliary floating member being movable under reverse rotation of the main floating member in a direction for said friction devices to engage each other, and means to yieldingly resist the movement of said auxiliary member under the action of the reverse rotation of the main floating member.

7. The combination with a main floating member including a gear, of a pinion meshing with said gear, means for supporting said pinion for lateral movement under the influence of the side pressure exerted thereon by said gear, means for yieldingly resisting said lateral movement and friction devices controlled by the lateral movement of said pinion to lock said main floating member against rotation.

8. The combination with a main floating member including a gear, of a pinion meshing with said gear, a friction member associated with said pinion to move therewith, a coöperating stationary friction member, means to permit said friction members to engage each other to lock said main floating member against rotation in one direction, and means to yieldingly resist movement of said friction members into engaging relation.

9. The combination with a main floating member including a gear, of a pinion meshing with said gear, a friction member carried by said pinion, a coöperating stationary friction member, said friction members coöperating to lock said gear against reverse rotation, a movable support for said pinion, and means for adjustably limiting the movement of said support.

10. The combination with a main floating member including a gear, of a pinion meshing with said gear, a friction member carried by said pinion, a coöperating stationary friction member, a yielding support for said pinion, and means for adjustably limiting the yielding movement of said support.

11. The combination with a main floating member including a gear, of a pinion meshing with said gear, a friction member carried by said pinion, a coöperating stationary friction member, said friction members coöperating to lock said gear against reverse rotation, and a spring supported arm carrying said pinion.

12. The combination with a main floating member including a gear, of a pinion meshing with said gear, a friction member carried by said pinion, a coöperating stationary friction member, said friction members coöperating to lock said gear against reverse rotation, a spring supported arm carrying said pinion, and means to adjustably regulate the yielding movement of said arm.

13. The combination with a main floating member including a gear, of a pinion journaled to rotate upon an axis parallel to the axis of said gear and meshing with said gear, a friction member carried by said pinion, said pinion mounted for lateral movement under the influence of the side pressure exerted thereon by said gear, means to yieldingly resist the lateral movement of said pinion, and a coöperating friction member engaged by the friction member carried by the pinion when said pinion is moved laterally in one direction to lock said gear against reverse rotation.

14. The combination with a stationary friction seat, a pinion carrying a friction member rotatable therewith and movable into and out of engagement with said seat when said pinion is shifted laterally, and means to yieldingly resist the lateral movement of said pinion in a direction to cause said friction member to engage said seat, of a main floating member carrying a gear meshing with said pinion and operating to rotate the same and to shift it laterally against the action of said yielding means.

15. In a device of the character described, the combination with a main floating member including a gear, of an auxiliary floating member including a pinion, said gear and pinion intermeshing with each other whereby a rotary and a lateral motion is imparted to said auxiliary floating member, means to yieldingly resist the lateral movement of said auxiliary floating member, and means controlled by the lateral motion of the auxiliary floating member for allowing said rotary motion in one direction but preventing it in the opposite direction.

16. In a device of the character described, the combination with a main floating member including a gear, of an auxiliary floating member including a pinion, and a support therefor, said gear and pinion intermeshing with each other whereby said pinion is rotated and said support is shifted, means to yieldingly resist the shifting movement of said support and means carried by said pinion and controlled by the shifting of said support for allowing said rotary motion in one direction but preventing it in the opposite direction.

17. The combination of a rotating member including a gear, a pinion meshing with said gear, a friction device carried by said pinion, and a movable support for said friction device and pinion, whereby when said gear starts to rotate in one direction said support is shifted to cause the friction device to lock said gear against further rotation while permitting free rotation of said gear when rotated in the other direction and means to yieldingly resist the shifting movement of said support.

In testimony whereof I have hereunto set my hand in the presence of the subscribing witnesses, on this 23rd day of November, A. D. 1916.

NORMAN WHICHELLO.

Witnesses:
ARTHUR WITT,
W. A. PARK.

Copies of this patent may be obtained for five cents each, by addressing the "Commissioner of Patents, Washington, D. C."